United States Patent [19]

Ledger

[11] Patent Number: 5,386,119
[45] Date of Patent: Jan. 31, 1995

[54] APPARATUS AND METHOD FOR THICK WAFER MEASUREMENT

[75] Inventor: Anthony Ledger, New Fairfield, Conn.

[73] Assignee: Hughes Aircraft Company, Los Angeles, Calif.

[21] Appl. No.: 37,069

[22] Filed: Mar. 25, 1993

[51] Int. Cl.$^6$ ............................................. G01B 11/06
[52] U.S. Cl. .................... 250/341.1; 356/355
[58] Field of Search .......................... 250/341; 356/355

[56] References Cited

U.S. PATENT DOCUMENTS 5,099,122  3/1992  Miki ..................................... 250/341

OTHER PUBLICATIONS

Cox et al., "Measurement of Si Epitaxial Thickness Using a Michelson Interferometer", J. Electrochem. Soc.: Solid-State Science and Technology, vol. 120, No. 2, Feb. 1973.

*Primary Examiner*—Carolyn E. Fields
*Attorney, Agent, or Firm*—H. P. Gortler; W. K. Denson-Low

[57] ABSTRACT

The thickness of the entire surface of a thick semiconductor (94) layer on an insulator is determined all at once by dividing the surface into a plurality of pixels, by varying the length of a variable length optical path (110) in a Michelson interferometer (66) having an infrared source (62), illuminating the entire surface of the layer with an image of the IR source during the length variation operation, and by detecting (64) the product of the intensity ($I_s(z)$) from the Michelson interferometer and the reflectivity R(t) of the layer as the path length is varied, such being indicative of the thickness of the layer, and by determining, for each pixel, which one of a plurality of groups of stored reflectance values, for a corresponding plurality of thicknesses, best matches the detected values, thereby providing a thickness map of the semiconductor layer.

14 Claims, 4 Drawing Sheets

APPARATUS AND METHOD FOR THICK WAFER MEASUREMENT

CROSS REFERENCE TO RELATED APPLICATIONS

This application discloses subject matter that may be disclosed and claimed in copending applications having the following Ser. Nos., filing dates and titles:

Ser. No. 07/804,872 (filed on Dec. 6, 1991) entitled "Apparatus and Method for Measuring the Thickness of Thin Films";

Ser. No. 07/906,079 (filed Jun. 29, 1992), now U.S. Pat. No. 5,291,269, entitled "Apparatus and Method for Performing Thin Film Layer Thickness Metrology on a Thin Film Layer Having Shape Deformations and Local Slope Variations";

Ser. No. 07/891,344 (filed May 29, 1992), now U.S. Pat. No. 5,293,214, entitled "Apparatus and Method for Performing Thin Film Layer Thickness Metrology By Deforming A Thin Film Layer Into A Reflective Condenser"; and Ser. No. 07/987,926 (filed Dec. 10, 1992) entitled "Apparatus and Method for Measuring the Thickness of Thin Films" and assigned to the assignee hereof and which are hereby expressly incorporated by reference.

BACKGROUND OF THE INVENTION

The present invention relates to an apparatus and method for measuring the thickness of a semiconductor such as the outer layer of a semiconductor-on-insulator wafer for thicknesses of more than five microns and up to many hundreds of microns.

There are no accurate full aperture imaging systems which can measure very thick layers of silicon in a bonded wafer and provide a thickness map of the outer layer. Commercial instruments operate one point at a time on the wafer in either the ultraviolet or visible region and cannot measure films hundreds of microns thick since the high absorption in the silicon outer layer effectively eliminates fringe formation.

Even though infrared radiation is not absorbed as much, it is difficult to achieve a plurality of narrowband infrared filters such as would be required to expose the wafer separately to many different infrared wavelengths (as was similarly done in the above mentioned copending application Ser. No. 07/804,872) with visible light for relatively thin layers of silicon on insulator, i.e., on the order of four or five microns or even tens of microns thick.

Semiconductor manufacturers presently purchase silicon wafers that have been micropolished down to the four-to-five micron thickness range. The above cited patent application permits smoothing down to less than 100 nanometers with uniformity better than 10 percent. Nevertheless, it has heretofore been required to purchase wafers already micromachined down to the four-to-five micron thickness level as a starting point. This is due to the inability of the visible light system disclosed in the above cited copending patent application to create a thickness map for wafers in the hundreds of micron thickness range for the reason of the absorption problems mentioned above.

It would be desirable to purchase thick wafers to begin with and be able to create a thickness map thereof so that high rate plasma assisted chemical etching (PACE) polishing might be used to remove the bulk of the layer now removed by conventional grinding and chemo-mechanical polishing technologies. If such thickness maps of thick silicon layers could be produced quickly (approximately one minute per map), then not only can less expensive starting wafers be used, but the map would allow partial smoothing of the outer film as the bulk of the layer is removed by a high rate plasma assisted chemical etching polishing process. The final thickness target would be in the four-to-five micron range and the additional smoothing afforded by the high rate PACE process would reduce local slopes and subsequently allow precise measurement with the visible metrology system disclosed in the above cited copending application.

SUMMARY OF THE INVENTION

An object of the present invention is to provide means and methods for measuring the outer semiconductor layer of a semiconductor-on-insulator wafer for film thicknesses on the order of hundreds of microns.

According to a method of present invention, the semiconductor layer of a semiconductor-on-insulator (wafer), wherein the semiconductor layer has a thickness of more than five or even hundreds of microns, has its thickness measured by combining an image of an IR source in a Michelson interferometer with a reflection of the IR source provided by the wafer over a selected variation in the optical path length of the Michelson interferometer. The combination will yield a Fourier burst at a path length corresponding to the thickness of the layer.

According to an apparatus of the present invention, an instrument for measuring the outer semiconductor layer of a semiconductor-on-insulator wafer comprises an IR source such as a Nernst glower and a Michelson interferometer combined with a reflective optical system that reflects a beam from the Michelson interferometer onto the wafer and provides a thickness image of all the pixels in the form of a thickness pattern that varies according to various mirror displacements of the interferometer. An infrared camera, for example, for the 3 to 5 micron region may be provided to capture the reflectance information from the wafer. A computer stores the images at each position of the mirror in the Michelson interferometer so that, for each pixel, the image at that mirror position may be compared to a plurality of groups of calculated values or groups of calibration values for determining the thickness by finding a best group fit.

The present invention applies to the measurement of thick, outer layers of semiconductors such as silicon in a semiconductor-on-insulator wafer such as silicon-on-insulator (SOI). Such an insulator may be silicon dioxide. The invention can also be used in measuring the thickness uniformity of silicon, germanium wafers and any other infrared transmitting material. A great deal of prior art exists in Fourier transform spectroscopy. However, imaging for transform infrared spectroscopy technology is not generally available and certainly no commercial measuring system exists to date. The present invention enables thickness maps of thick silicon layers to be produced in a timely manner, i.e., at less than one minute per map. Not only can less expensive starting wafers be used, but the map allows partial smoothing of the outer film as the bulk of the layer is removed by a high rate PACE polishing process. A final thickness in the range of four-to-five microns is achieved and additional smoothing may be achieved using the teachings of the above cited copending application 07/804,872 by the high rate PACE process to reduce local slopes and subsequently allow precise measurement with a visible metrology system.

These and other objects, features and advantages of the present invention will become more apparent in light of the following detailed description of a best mode embodiment thereof, as illustrated in the accompanying drawing.

DETAILED DESCRIPTION OF THE INVENTION

Figure 1:
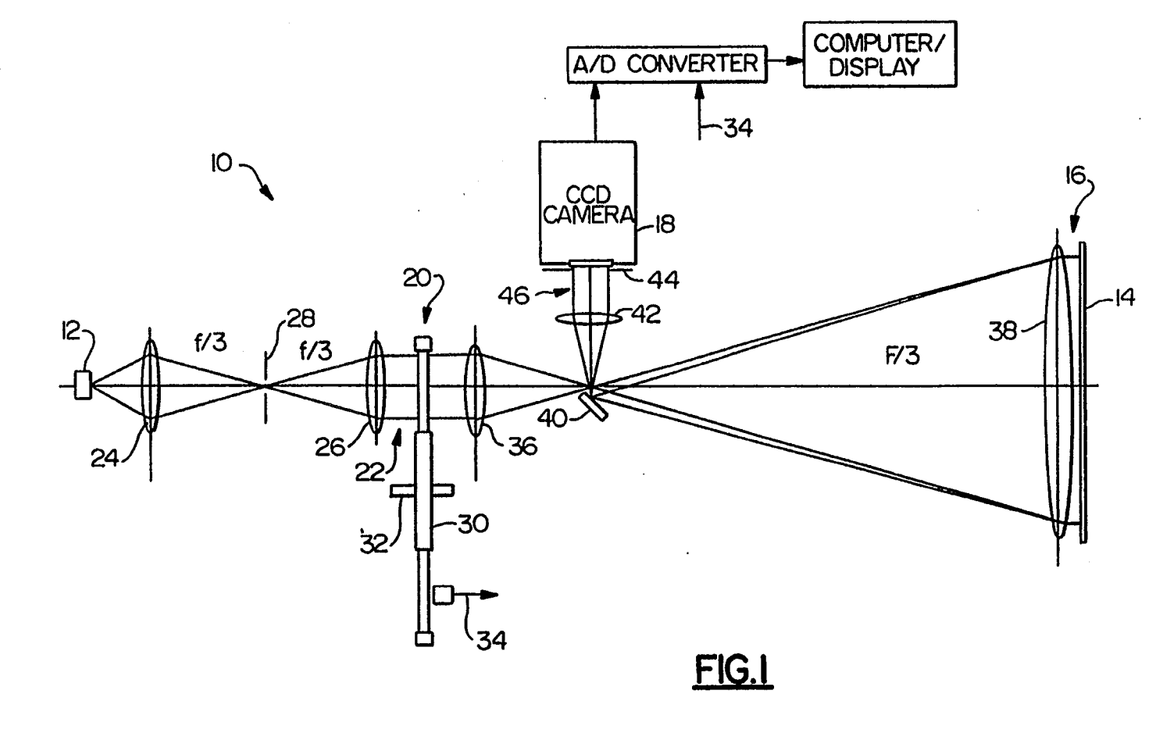
FIG. 1 shows a visible light metrology system for measuring thin film semiconductor layers, according to a copending application cited herein and incorporated by reference.

FIG. 1 shows an apparatus 10 which is a simplified version of a similar apparatus disclosed in the above cited copending application having U.S. Ser. No. 07/804,872. The invention disclosed in that application included an electro-optical system for measuring the outer silicon layer thickness of a silicon on insulator (SOI) semiconductor wafer. The instrument measures the surface reflectance of the wafer over a full aperture at several discrete wavelengths and computes the outer film thickness map either by numerical iteration or by the use of a calibration wafer. This thickness map can be subsequently used by a micropolishing system such as a plasma assisted chemical etching (PACE) system to thin the outer layer to 1,000 Å average thickness to an accuracy of 100 Å.

For that case, the choice of the optical system was the key to obtaining the high contrast ratio spectral mapping data at high speed. Prior art systems use a focused spot or illuminated fiber bundle at the wafer surface followed by a grating or prism spectrograph to measure the surface spectral reflectance variations. Surface mapping is obtained in the prior art by moving the wafer, by scanning a line image, or using an array of fiber bundles operating as localized illuminator/collectors. In all cases, this reflectance data must then be numerically corrected due to variations in angle of incidence caused by the illuminator beam aperture number.

As disclosed in the copending application Ser. No. 07/804,872, a better method is to illuminate with a lamp such as a halogen lamp 12 the entire wafer 14 and perform all imaging in collimated light 16 so that the angle of incidence over the entire wafer is zero. This results in the most compact optical system 10 since field angles are insignificant and also allows significantly simpler (and faster) measurement of the reflectance/thickness map by using either numerical computations or taking spectral measurement from a calibration wafer. High overall speed is attained by measuring the full aperture of the wafer with a CCD camera 18, thereby eliminating any wafer motion during data acquisition. Reflectance maps are obtained at different wavelengths by using a series of narrowband filters on a filter wheel 20 in collimated light 22 (3250 Å half bandwidth) rotating at typically 60 RPM. The wheel may include, for example, up to 20, approximately 2 centimeter diameter filters. The use of collimated light at the narrow band filter also produces the narrowest spectral bandwidth (high fringe visibility) and simplifies data reduction. The optical system can be configured to measure thin film thicknesses by using combinations of different wavelengths, different fixed angles and polarization states.

The white light source 12 for the instrument 10 may comprise a circular aperture illuminated either by a halogen lamp and condensing lens 24 or by a fiber optic light source. The size of the aperture determines the field angles in the collimated sections of the optical system and the orientation is chosen to allow the return aperture image to be folded out to the CCD camera 18. The white light source is spectrally filtered by a series of narrowband filters 20, nominally 30 to 50 Å half bandwidth placed in the collimated beam formed by a lens 26 responsive to light from a slit source 28 where the slit is perpendicular to the illustration of FIG. 1. The set of filters 20 is placed around the periphery of a moving filter wheel 30 having an axis 32 for rotating, for example, at 60 RPM for illuminating the wafer 14 in rapid succession with monochromatic light of different wavelengths. An electronic signal on a line 34 is generated by the filter wheel to serve as a read-out time reference for the digitizing system attached to the CCD camera 18. Locating the filter in a collimated section 22 minimizes spectral broadening of the filter shape caused by the different field angles defined by the primary slit size.

A second lens 36 relays the monochromatic image of the primary aperture to the focal plane of the objective lens 38, which collimates the light 16 and illuminates the full aperture of the SOI wafer which may, for example, have a diameter of 100 mm. The reflected light returns through the same lens 38 and forms an image alongside the original. Separation of the two images can be effected by a small lateral shift in the optical axis of the lens 38 with respect to the optical axis of the lens 24, 26, 36. Equivalently, the wafer can be tilted through a small angle less than one degree to achieve the same effect. Or, an on-axis beamsplitter can be used. A small pick-off mirror 40 is used to redirect the reflected light from the wafer to a final lens 42, which again forms a collimated beam of a diameter which matches the shortest side of a CCD detector array (typically 6.6 mm for a 1.69 centimeter commercial camera format). Additionally, a real image 44 of the wafer is formed in a collimated light space 46 and the CCD camera focal plane is placed in this position. It should be noted that variations of the above described apparatus 10 are certainly possible and are described in some detail in the above cited copending patent application Ser. No. 07/804,872. That application also shows in FIGS. 3 and 4 thereof the surface of such a wafer including division into pixels as described in the text thereof at page 9, lines 15–25 and page 11, lines 3–27.

A numerical method of measurement of the outer film thickness which varies over the surface of the wafer 14 is also described in the copending patent application Ser. No. 07/804,872 and comprises the assumption of values for the thin film constants and calculating spectral reflectances, at a predefined set of wavelengths, for the two-film system. An SOI semiconductor wafer consists of a silicon/silicon dioxide/silicon (Si/SiO$_2$/Si) sandwich structure fabricated by growing silicon dioxide on two wafer surfaces and bonding the two silicon dioxide faces together at high temperature. One of the outer silicon faces of the sandwich is then mechanically ground and polished to an average thickness of several microns. This polishing process is unfortunately quite expensive and adds considerable value to the silicon wafers purchased prior to being processed by the system of FIG. 1. The etalons purchased by the pre-processors for mechanical grinding or polishing are typically grown to thicknesses much greater than several microns. As discussed above, these may have thickness measurements of 100 or several hundred microns. Unfortunately, as also suggested above in the Summary of the Invention, the system of FIG. 1 provides light that is heavily absorbed by silicon at such thicknesses. As also mentioned above, it would be advantageous to be able to skip the mechanical grinding and polishing from several hundred microns down to several microns.

Figure 2:
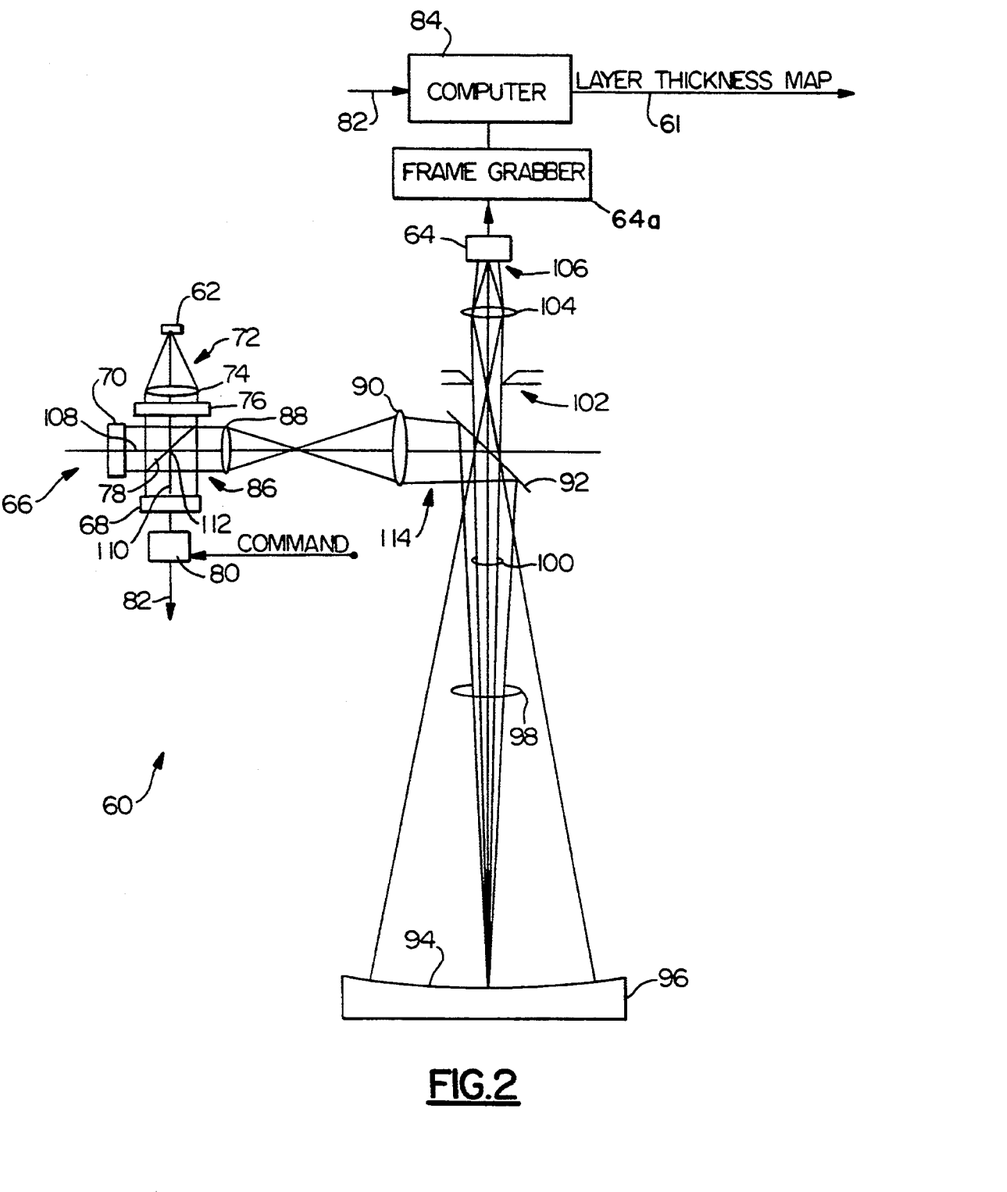
FIG. 2 shows an apparatus, according to the present invention, using a Michelson interferometer for measuring thick semiconductor layers on an insulator for film thicknesses of between five and many hundreds of microns.

FIG. 2 shows an instrument 60, according to the present invention, that may be used to measure the outer silicon layer of a silicon-on-insulator (SOI) wafer for film thicknesses greater than five microns and up to many hundreds of microns. The instrument of FIG. 2 is an accurate, full aperture imaging system which can measure very thick layers of silicon (or germanium and other materials transmissive to IR) in a bonded wafer and provide a thickness map on a signal line 61 of the outer layer. The process can also be applied to thick layers of free standing materials such as silicon where both sides are polished. Present day commercial instruments operate in the UV or visible region and cannot measure films hundreds of microns thick since the high absorption in the silicon outer layer effectively eliminates fringe formations. Moreover, such commercial instruments only operate one pixel at a time. The instrument of FIG. 2 combines the high speed concept of the instrument of FIG. 1 as disclosed in the above cited copending patent application having U.S. Ser. No. 07/804,872 with a Michelson interferometer to allow a thickness map to be rapidly provided.

The instrument 60 of FIG. 2 modifies the instrument 10 of FIG. 1 by changing the wavelength band to the 3-5 micron region and using an infrared source such as a Nernst Glower extended source 62 and an infrared camera 64 having an array for the 3-5 micron region. A Michelson interferometer 66 is provided in lieu of the reflective optical system shown in FIG. 1 so that an infrared imaging system is created. The film thicknesses can be determined directly from the interferogram (Fourier transform of the wave reflectance) generated by moving one mirror 68 of a pair of mirrors 68, 70 in the Michelson interferometer 66. Thus, by operating in the 3-5 micron region, an imaging Fourier interferometer is provided in which the interferogram is used to directly measure film thickness, as opposed to the method of computing the inverse Fourier transform of the interferogram to produce the original spectrum. This latter step is unnecessary, since the film structure provides a unique interferogram, characteristic of layered systems.

Figure 3:
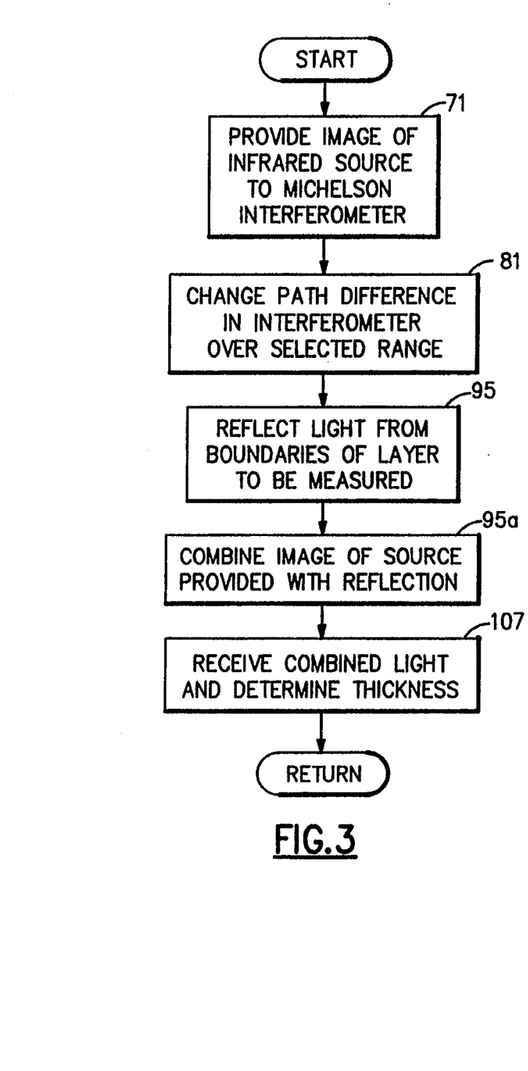
FIG. 3 shows a method, according to the present invention, for determining layer thickness.

As shown in a step 71 in FIG. 3, radiation 72 from the extended infrared source 62 is collimated by a lens 74 and filtered by a broadband filter 76 to select light in the 3-5 micron region. This radiation passes through the Michelson interferometer 66 comprising a beamsplitter 78 and the two mirrors 68, 78. The mirror 68 is attached to a precise drive mechanism 80 which can translate the mirror 68 along its optical axis as shown in a step 81 in FIG. 3. An output on a line 82 provides a fine measure of the position of the mirror to a computer 84. The accuracy of the linear position may be on the order of 100 Å. An output 86 from the Michelson interferometer 66 is relayed by lens 88, 90 and a beamsplitter 92 such that the surface of source 62 is imaged onto or close to a surface of a shaped wafer 94 as indicated in a step 95 in FIG. 3.

The image of the source is thus combined with its reflection as indicated in a step 95a in FIG. 3. The extended source 62 is used to illuminate the wafer 94 over a small range of angles to eliminate any vignetting of the final wafer image caused by wafer bowing. A vacuum chuck 96 may be used to shape the SOI wafer, e.g., (150 micron silicon) and being, for example, 100 to 200 millimeters in diameter. If the maximum bow angle of the wafer normal is $\phi$ and the input solid angle ($\Omega_1$) 98 is the illumination solid angle at any point on the wafer, and the output solid angle ($\Omega_2$) defined by the receiver optical system (i.e., a pin hole diameter created by an aperture stop 102 and the radius of curvature of the wafer) then the condition $$\Omega_1 \geq \pi\phi^2 + \Omega_2$$

must be satisfied if a fully illuminated image of the wafer is to be created at the camera 64 with no vignetting. The wafer 94 may be shaped by the vacuum chuck 96, as shown, to reflect the incident light 98 as reflected light 100 through the pin hole of aperture stop 102. Such an approach, using a vacuum chuck, is disclosed in copending U.S. application Ser. No. 07/891,344 filed May 29, 1992 entitled "Apparatus and Method for Performing Thin Film Layer Thickness Metrology by Deforming a Thin Film Layer into a Reflective Condenser" which is hereby incorporated in its entirety by reference. The pin hole is placed approximately at the radius of curvature of the shaped wafer so that the wafer acts like a reflective condenser system and reflects all the combined light back to the vicinity of the pin hole. A lens 104 is used to form an image of the wafer at the camera focal plane 106.

The thickness measurement of the SOI wafer 94 proceeds as indicated in a step 107 of FIG. 3 by recording images on the camera 64 at incremental lengths of the optical path in the interferometer as the mirror 68 is translated. It is translated from a zero path length difference position, i.e., a zero difference between a path length 108 and a path length 110 from the respective mirrors 70, 68 to an intersection point 112 of their optical axis within the Michelson interferometer 66, to a distance greater than nt where n is the refractive index of the silicon in the 3-5 micron region and t is the thickness of the layer being measured. Typically, the refractive index of silicon in this region is 3.45 so that the mirror 68 must be driven to greater than 3.45 times the thickness of the silicon film before a characteristic signature of the layer is detected, as shown in FIG. 3. The recorded images on the camera 64 are supplied to the computer 84 via a frame grabber 64a.

The detected signal P(z) is the product of the intensity ($I_s(z)$) from the Michelson interferometer and the reflectivity (R(t)) of the wafer as the path length (z) in the Michelson is varied. The physical process of producing such a signal (P(z)) for detection may be represented as follows:

$$P(z) = \int_{\lambda_1}^{\lambda_2} R(t)I_s(z)d\lambda,$$

where t is the thickness and z is varied from zero path difference to a difference greater than nt, where n is the index of refraction of the layer, as suggested above and the range of wavelengths is the spectral wavelength limits of the instrument.

Figures 4, 4A:
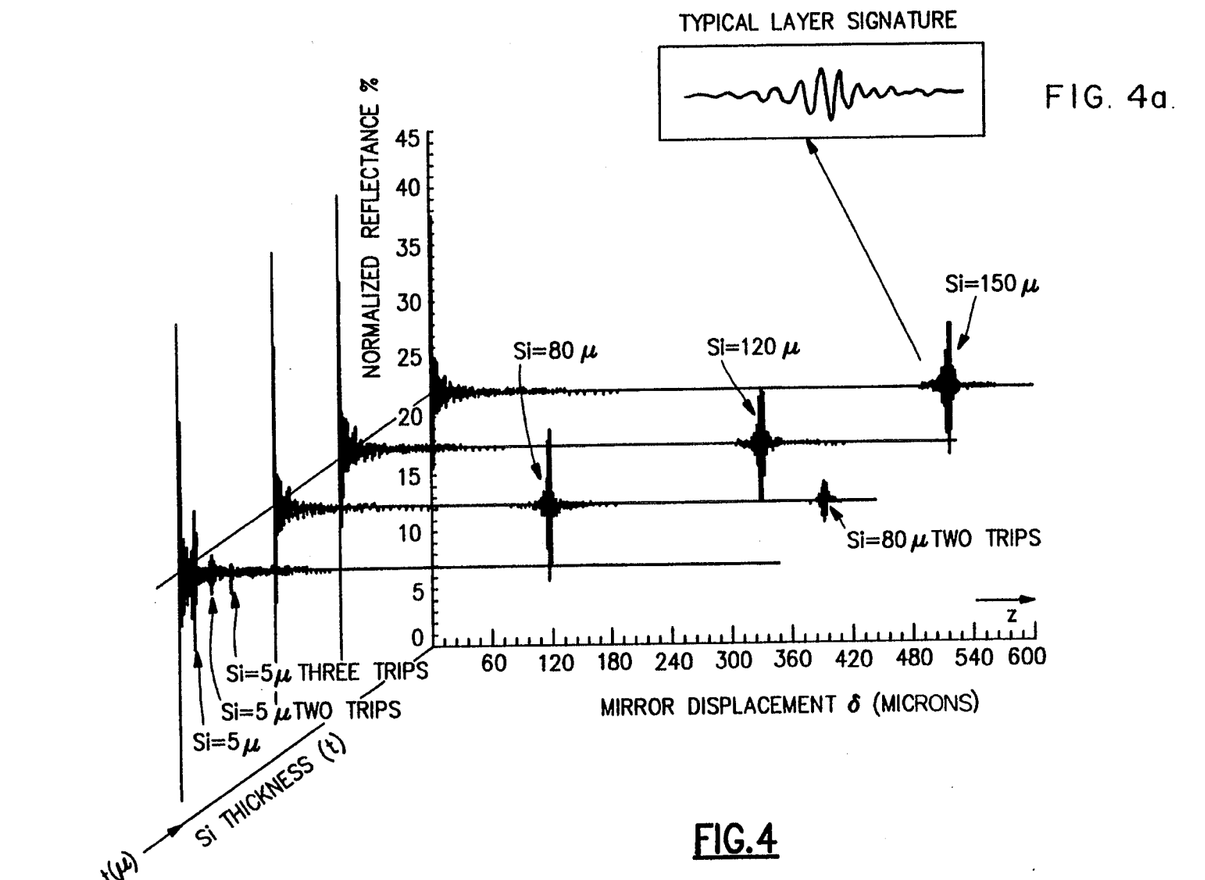
FIGS. 4 and 4a show layer signatures for various film thicknesses in an SOI wafer, according to the present invention.

The layer signatures for some thicknesses, i.e., of 5 microns, 80 microns, 120 microns and 150 microns in an SOI wafer are shown in FIGS. 4 and 4a. These response curves are for a bandwidth of 3.0 to 5.0 microns and a z-axis (along optical axis 110) resolution of 1 micron (i.e., the position of the mirror 68). As shown in FIG. 4, several signal bursts occur at multiples of the primary translation distance corresponding to multiple bounces within the layer. However, it will be observed, that the burst corresponding to the actual thickness will have a higher amplitude.

The interferometric signature expected for a uniform layer would be a rapid fluctuation in intensity of the whole image as the mirror 68 is moved through the point where the optical path difference of the two mirrors 68, 70 matches the optical path difference between the two silicon surfaces forming the thick film. In the case of a non-uniform silicon thickness, translation of the mirror 68 causes shadows or fringes to move across the full image of the wafer 94. The measurement of the images thus produced requires more or less continuously or intermittently capturing images at the focal plane 106 of the camera 64 of the wafer as the mirror 68 is scanned from zero path difference to more than 3.45 times the expected thickness of the silicon film and then determining, for each pixel, the mirror position that produces a burst for that pixel. This image acquisition step is illustrated in a step 120 in FIG. 5. The mirror displacement that produces a maximum burst for a given pixel corresponds to the thickness of the film at that point on the wafer.

The resolution of the thickness measurement can be enhanced by carefully measuring the amplitude variations of the burst signature and estimating or finding the maximum. This can be done by full knowledge of the reflectance characteristics of silicon over the wavelengths of interest and matching the detected signatures thereto by computing a merit function comparison similar to that disclosed in the above cited copending application U.S. Ser. No. 07/804,872. Such a merit function draws from a library of precalculated reflectances for silicon at the various wavelengths and forms, for each sample reflectance for each pixel, a difference between each value in the library which is then squared and summed for that reflectance sample. Such a summation is done for each sample for each pixel and the merit function having the smallest difference is the one having the closest comparison and is selected as being the one corresponding to the thickness of the layer for that pixel.

Figure 5:
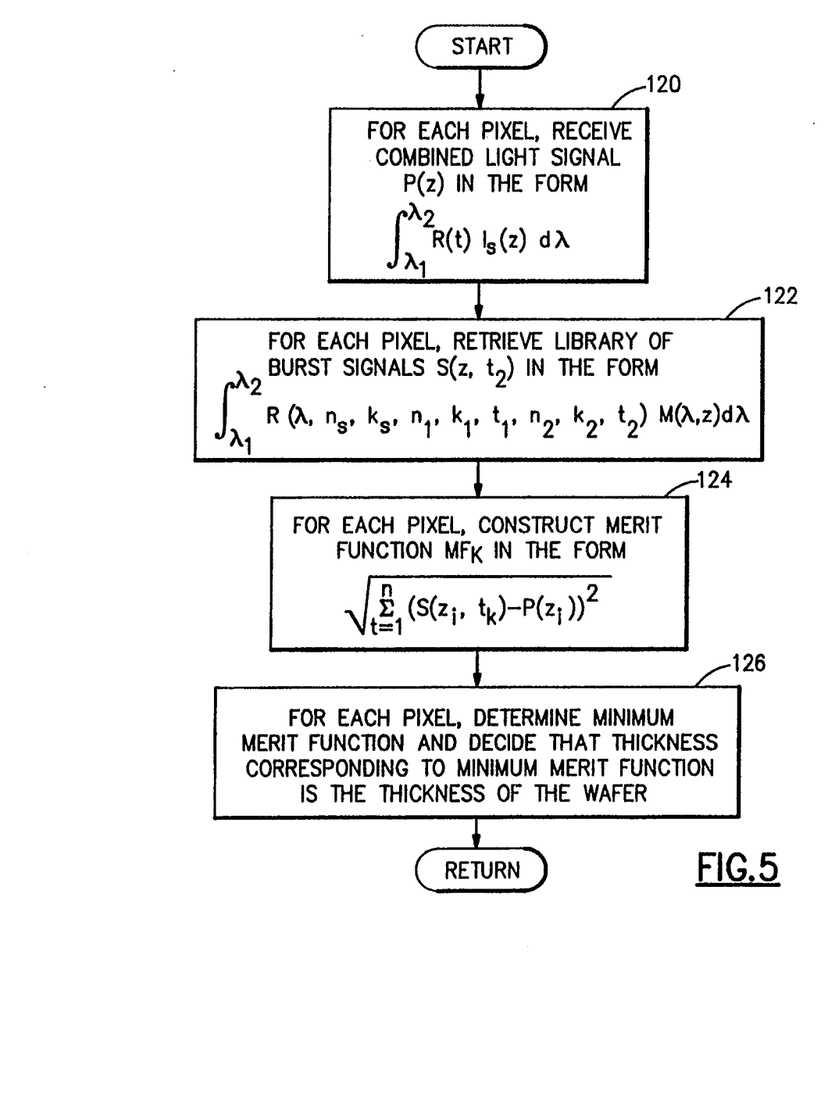
FIG. 5 shows image acquisition and computation of a merit function, according to the present invention.

In other words, a library of burst signals (S(z,t₂)) for an SOI wafer illuminated by a Michelson interferometer is obtained by evaluating the integral:

$$S(z,t_2) = \int_{\lambda_1}^{\lambda_2} R(\lambda,n_s,k_s,n_1,k_1,t_1,n_2,k_2,t_2)M(\lambda,z)d\lambda$$

where $\lambda_1$, $\lambda_2$ are the spectral wavelength limits of the instrument, $R(\lambda,n_s,k_s,n_1,k_1,t_1,n_2,k_2,t_2)$ is the reflectance of the SOI wafer and $M(\lambda,z)$ is the transmission of the Michelson interferometer, which illuminates the wafer. The parameter z is the difference in path length between the two arms of the interferometer. The reflectance of the SOI wafer is determined by the optical constants $n_s,k_s$ of the substrate and the optical constants $n_1,k_1,t_1$ and $n_2,k_2,t_2$ of the two films of thickness $t_1$ and $t_2$ in the SOI structure. It should be realized that such a library may be constructed from a calibration wafer in a manner similar to the method shown in connection with FIG. 4 of copending application Ser. No. 07/804,872. In either event, such a library is retrieved, as shown in a step 122 in FIG. 5 for each pixel.

A merit function $MF_k$ is constructed, as shown in a step 124, between a set of library burst signals $S(z,t_k)$ for a thickness $t_k$ and a set of measured data $P(z_i)$ at a set of distances $z_1 \ldots z_n$, i.e., $$MF_k = \sqrt{\sum_{i=1}^{n} (S(z_i,t_k) - P(z_i))^2}$$

Clearly, if the measured and precalculated signals match exactly at some thickness value $t_k$, then the merit function will be zero. In practice, the data contains noise and a zero value is not obtained. In this case the minimum value is sought by starting with a set of distances $z_1 \ldots z_n$, computing the merit functions for all values of $t_k$ and then progressively increasing the distance values to $z_1+\Delta \ldots z_n+\Delta$ where $\Delta$ is the smallest resolvable increment of the mirror drive. The set of merit functions for each set of distances is computed continuously until a minimum merit function is obtained, as indicated in a step 126, at which point the value of $t_2$ is determined.

In a similar way, the algorithm can be used to determine the thickness $t_1$ of a free standing polished slab of silicon or other IR transmitting material by generating libraries for values of $t_1$ with $t_2=0.0$ and $n_s=1.0$ and $k_s=0.0$ (air).

This and other equivalent techniques may be used to find the maximum of the layer signature in order to find the thickness with a high degree of accuracy.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A method for determining thickness of a semiconductor layer, comprising the steps of:
   combining an input light image of an infrared source with an output reflected light image of the source from the semiconductor layer which input and output light images traverse a variable length image path; and
   detecting, for each of a plurality of areas of a surface of the semiconductor, a signal burst in the combined input and output light images at a discrete length in the variable length image path corresponding to the thickness of the semiconductor layer.

2. The method of claim 1, further comprising the steps of:

for each area, sampling the magnitude of the signal burst at a plurality of selected spaced apart sample points in proximity to the detected discrete length; and comparing the sampled magnitudes of the signal burst to signal magnitudes corresponding to similarly spaced apart samples of a plurality of known thickness semiconductor layers for matching one of the plurality of known layer thickness samples to the signal burst sample points for determining the thickness.

3. The method of claim 2, wherein, for each area, the step of comparing comprises the steps of:

comparing a plurality of groups of stored samples of known thickness layers to the signal burst sample points; and finding a group of stored samples that more closely matches the signal burst sample points than any other group.

4. A method for determining thickness of a semiconductor layer, comprising the steps of:

providing an image of an infrared light source to a beamsplitter in an interferometer having a stationary mirror and a movable mirror that is movable from a first point to a second point;

moving the movable mirror from the first point to the second point;

providing, as the movable mirror moves, an input light image of the source from the interferometer to surface boundaries of the semiconductor layer for reflection therefrom as reflected, output light;

receiving, in response to the output light, as the movable mirror moves, images of the source reflected from the boundaries;

determining the thickness of the semiconductor layer for each of a plurality of separate areas of the semiconductor layer according to a discrete position of the movable mirror corresponding to a detection of a signal burst in the reflected output light for each separate area.

5. Apparatus comprising:

an infrared (IR) source for providing an IR source signal;

a Michelson interferometer having a variable optical path length, responsive to the IR source signal, for providing images of the IR source signal at various lengths of the optical path;

first means, responsive to the images of the IR source signal, for combining, for each length of the optical path, the image of the IR source signal and a reflection thereof from a semiconductor layer; and second means, responsive for each length of the optical path to the combined image of the IR source signal and its reflection for each of a plurality of areas of the layer, for providing a layer thickness map signal indicative of the thickness of the layer for each of the plurality of areas.

6. The apparatus of claim 5, wherein the Michelson interferometer comprises:

a beamsplitter, responsive to the IR source signal, for providing a first reflected signal along an axis and for providing a transmitted signal along the variable optical path length axis;

a stationary mirror, responsive to the first reflected signal along the axis and to the reflection of the IR source from the semiconductor layer along the axis, for providing a second reflected signal along the axis;

a movable mirror, responsive to the transmitted signal along the variable optical path length axis and to the reflection of the IR source from the semiconductor layer along the variable optical path length axis, for providing a third reflected signal along the variable optical path length axis; and wherein the beamsplitter combines the second reflected signal along the axis and the third reflected signal along the variable optical path length axis, for providing the images of the IR signal at various lengths of the variable optical path length axis.

7. The apparatus of claim 5, further comprising lens means, responsive to the images of the IR signal at the various lengths of the optical path, for providing a collimated image signal to the first means.

8. The apparatus of claim 5, further comprising means for illuminating the plurality of areas at the same time.

9. The apparatus of claim 5, further comprising:

an aperture, responsive to the combined image of the IR source signal and its reflection, for passing a selected portion of the combined image;

a lens for focusing the selected portion of the combined image of the IR source signal and its reflection; and an infrared camera for recording the focused portion of the combined image of the IR source and its reflection, the recorded image being provided to the second means.

10. The apparatus of claim 9, further comprising a frame grabber, responsive to the images recorded in the camera, for providing the recorded images to the second means.

11. The apparatus of claim 5, further comprising means for providing a signal having a magnitude indicative of the length of the variable optical path length, and wherein the second means is responsive to the length signal for correlating each length of the optical path to the combined image of the IR source signal and its reflection.

12. A method of determining thickness of a semiconductor layer using a Michelson interferometer and an infrared source, said interferometer having a variable length optical path, comprising the steps of:

varying the length of the variable length optical path;

illuminating a plurality of areas of the semiconductor layer with an image of the infrared source during the varying of the length of the variable length optical path;

forming a product of the image of the infrared source and its reflection from the semiconductor layer for each of a plurality of said areas; and determining a thickness map of the semiconductor layer by comparing the products for said areas to a priori values.

13. Apparatus for determining thickness of a semiconductor layer, comprising:

an infrared source;

a Michelson interferometer, illuminated by the infrared source, for providing an image of the source, said interferometer having a variable length optical path;

an actuator for varying the variable length optical path over a path length greater than the thickness of the semiconductor layer times its index of refraction;

means for illuminating an entire surface of the semiconductor layer with an image of the infrared source during a period in which the length of the variable length optical path of the Michelson interferometer is being varied; and means for detecting a product of the image and a reflection of the image from the semiconductor layer, said product being indicative of a thickness of the semiconductor layer.

14. The apparatus of claim 12, wherein the actuator is responsive to a command signal for causing the variable optical path length of the Michelson interferometer to vary.

* * * * *